US009108660B2

(12) United States Patent
Sundberg et al.

(10) Patent No.: US 9,108,660 B2
(45) Date of Patent: Aug. 18, 2015

(54) STROLLER

(71) Applicant: Dorel Juvenile Group, Inc., Foxboro, MA (US)

(72) Inventors: Brian C Sundberg, Chester, NH (US); Kurt Nygren, Harvard, MA (US); Walter S Bezaniuk, Berkley, MA (US); Joseph D Langley, Foxboro, MA (US)

(73) Assignee: Dorel Juvenile Group, Inc., Foxboro, MA (US)

( * ) Notice: Subject to any disclaimer, the term of this patent is extended or adjusted under 35 U.S.C. 154(b) by 0 days.

(21) Appl. No.: 14/593,916

(22) Filed: Jan. 9, 2015

(65) Prior Publication Data
US 2015/0197270 A1 Jul. 16, 2015

Related U.S. Application Data

(60) Provisional application No. 61/971,278, filed on Mar. 27, 2014, provisional application No. 61/926,129, filed on Jan. 10, 2014.

(51) Int. Cl.
*B62B 1/00* (2006.01)
*B62B 9/12* (2006.01)
(52) U.S. Cl.
CPC ........................................ *B62B 9/12* (2013.01)

(58) Field of Classification Search
USPC .............. 280/47.38, 639, 642–644, 647–650, 280/658
See application file for complete search history.

(56) References Cited

U.S. PATENT DOCUMENTS

| 4,216,974 | A | | 8/1980 | Kassai |
| 4,765,645 | A | | 8/1988 | Shamie |
| 5,460,399 | A | * | 10/1995 | Baechler et al. .............. 280/650 |
| 5,599,033 | A | * | 2/1997 | Kolbus et al. ................. 280/204 |
| 6,428,034 | B1 | | 8/2002 | Bost |
| 6,682,090 | B2 | | 1/2004 | Chen |
| 6,976,697 | B2 | * | 12/2005 | Britton et al. ................. 280/647 |
| 7,168,728 | B2 | | 1/2007 | Suga et al. |
| 7,229,091 | B2 | | 6/2007 | Lan |
| 7,341,265 | B1 | * | 3/2008 | Liu ............................... 280/204 |
| 7,434,827 | B2 | | 10/2008 | Yeh et al. |
| 7,770,911 | B2 | | 8/2010 | Dotsey et al. |
| 8,205,907 | B2 | | 6/2012 | Chicca |
| 2005/0127640 | A1 | | 6/2005 | Worth et al. |
| 2013/0113189 | A1 | | 5/2013 | Doucette et al. |
| 2013/0140797 | A1 | | 6/2013 | Fritz et al. |

* cited by examiner

Primary Examiner — John Walters
Assistant Examiner — James Triggs
(74) Attorney, Agent, or Firm — Barnes & Thornburg LLP

(57) ABSTRACT

A compact collapsible stroller includes a mobile base provided with front and rear wheels. A push handle is coupled to the mobile base.

19 Claims, 6 Drawing Sheets

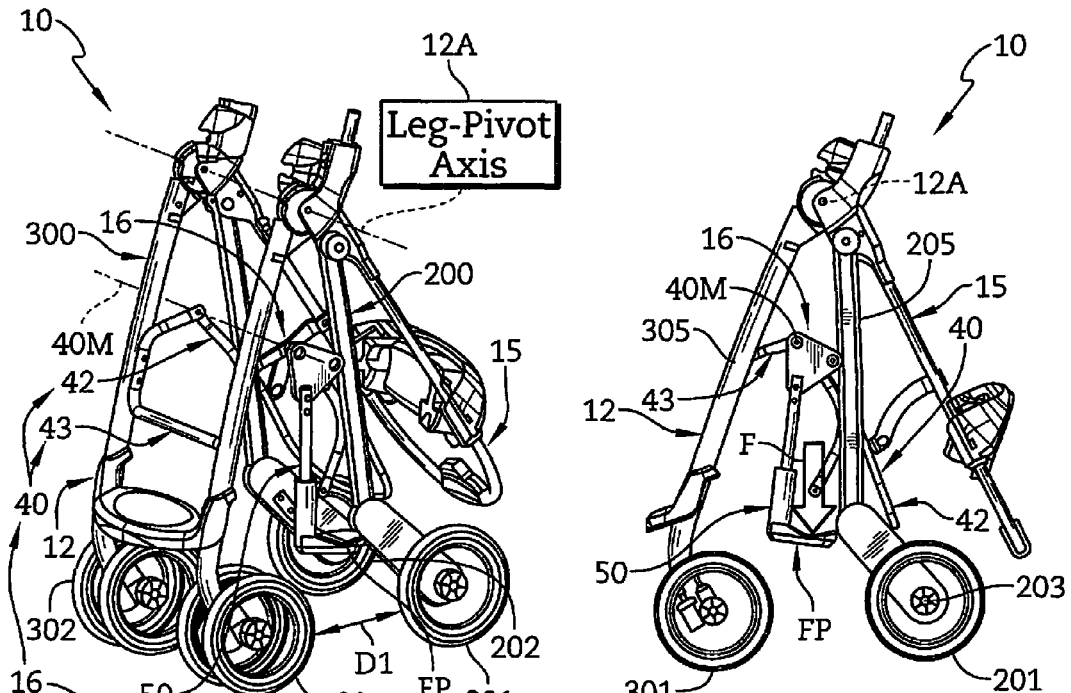
*FIG. 1*
*FIG. 2*
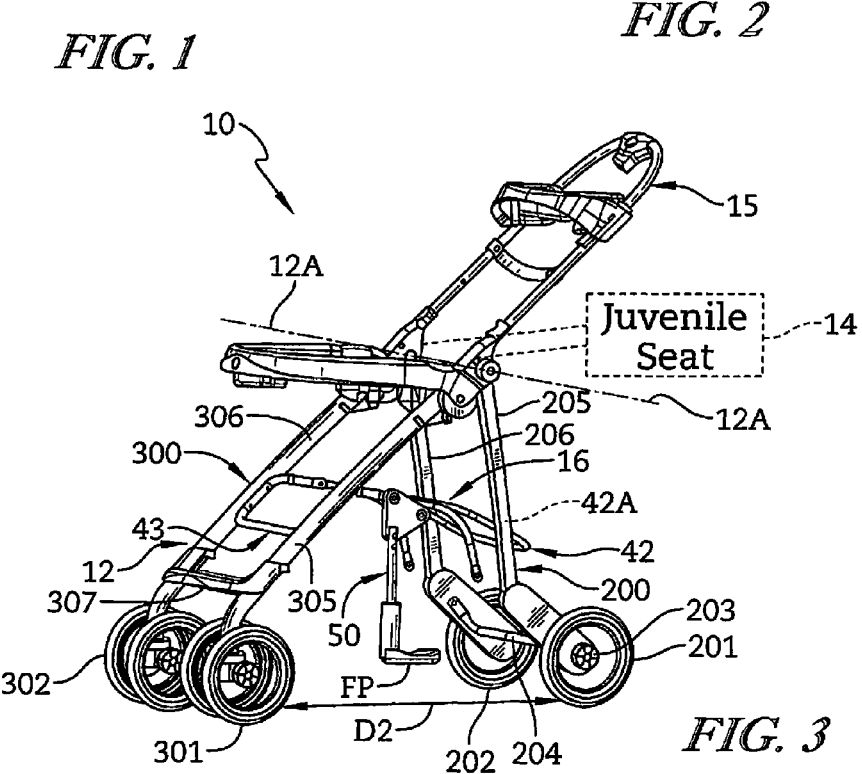
*FIG. 3*

STROLLER

PRIORITY CLAIM

This application claims priority under 35 U.S.C. §119(e) to U.S. Provisional Application Ser. No. 61/971,278, filed Mar. 27, 2014 and Ser. No. 61/926,129, filed Jan. 10, 2014, both of which are expressly incorporated by reference herein.

BACKGROUND

The present disclosure relates to collapsible strollers for juveniles, and particularly to strollers including a frame assembly, a seat, and several wheels. More particularly, the present disclosure relates to a collapsible and expandable frame assembly for a juvenile stroller.

SUMMARY

A compact collapsible stroller in accordance with the present disclosure includes a mobile base provided with front and rear wheels. A push handle is coupled to the mobile base in illustrative embodiments.

In illustrative embodiments, the mobile base is foldable at the option of a caregiver using a foot-actuated base opener during controlled collapse of the collapsible stroller. The mobile base includes a rolling rear-leg unit and a rolling front-leg unit that can be moved away from a folded position that is located alongside the rolling rear-leg unit and associated with a collapsed storage mode of the stroller to an unfolded position that is associated with an expanded use mode of the stroller when the mobile base is unfolded so that a child can be seated on a juvenile seat coupled to the mobile base. In illustrative embodiments, the rolling rear-leg and front-leg units pivot about a common pivot axis during folding and unfolding of the mobile base.

In illustrative embodiments, the stroller includes a foot-actuated base opener coupled to the rolling front-leg and rear-leg units of the mobile base. A caregiver operates the foot-actuated base opener to initiate folding of mobile base and change the stroller from a collapsed storage mode to an expanded use mode by stepping on a foot pedal included in the foot-actuated base opener and moving the foot pedal toward the ground underlying the mobile base. This downward movement of the foot pedal causes the rolling front-leg unit to move away from the folded position located alongside the rolling rear-leg unit to the unfolded position associated with the expanded use mode of the stroller.

In illustrative embodiments, the foot-actuated base opener includes a spreader mover including a foot pedal and a leg spreader coupled to the spreader mover to move therewith. The leg spreader is also coupled to the rolling front-leg and rear-leg units. Downward movement of the foot pedal included in the spreader mover in response to application of a downward force by a caregiver to the foot pedal causes the leg spreader to move the rolling front-leg unit relative to the rolling rear-leg unit about a single (common) horizontal leg-pivot axis away from the folded position located alongside the rolling rear-leg unit to the unfolded position associated with the expanded use mode of the stroller in illustrative embodiments.

In illustrative embodiments, the leg spreader of the foot-actuated base opener is a mechanical linkage that is located below the juvenile seat and below the single (common) horizontal leg-pivot axis. The leg spreader comprises a leg driver including a front-leg driver coupled to the rolling front-leg unit and a rear-leg driver coupled to the rolling rear-leg unit. The leg spreader also comprises a coupling associated with the leg driver and arranged to establish two pivot axes. An outer portion of the front-leg driver is coupled rigidly to the rolling front-leg unit to move therewith about the leg-pivot axis. An outer portion of the rear-leg driver is coupled to the rolling rear-leg unit for pivotable movement about a rear pivot axis. Inner portions of the front-leg and rear-leg drivers are coupled to one another for relative movement about a middle pivot axis that is parallel to the rear pivot axis and that lies below the single (common) horizontal leg-pivot axis. The front-leg and rear-leg drivers pivot relative to one another about the middle pivot axis as the mobile base is unfolded and folded.

In illustrative embodiments, the spreader mover of the foot-actuated base opener is coupled to the leg spreader to pivot about the middle pivot axis in response to foot movement of a caregiver. The spreader mover is formed to include a foot pedal arranged to be accessed and used by a caregiver when the mobile base is folded and the stroller is in the collapsed storage mode to cause the leg spreader to move so that the mobile base is unfolded and the stroller is changed to the expanded use mode.

Downward movement of the foot pedal and spreader mover in response to a downward force applied to the foot pedal by the foot of a caregiver illustratively moves the leg spreader relative to the front-leg and rear-leg units and causes a folded mobile base of a stroller to unfold to change the mode of the stroller from collapsed storage mode to expanded use mode. In use, while the mobile base is folded and the stroller is in the collapsed storage mode, a caregiver desiring to change the stroller to the expanded use mode steps on the foot pedal included in the spreader mover and pushes downwardly on the foot pedal to pull the inner portions of the pivotable front-leg and rear-leg drivers downwardly simultaneously to cause outer portions of the front-leg and rear-leg drivers to move away from one another. Such spreading apart of the front-leg and rear-leg drivers causes the rolling front-leg unit to pivot relative to the rolling rear-leg unit about a single (common) horizontal leg-pivot axis and away from the rolling rear-leg unit and begin to unfold the mobile base. This foot pressure is applied by the caregiver until the front and rear wheels in the rolling front-leg and rear-leg units are spread far enough apart to unfold the mobile base fully and therefore cause the stroller to be converted to expanded use mode.

A pedal-return spring is also included in illustrative embodiments of the foot-actuated base opener. In some illustrative embodiments, the pedal-return spring is coupled to the rear-leg driver of the spreader mover and configured normally to apply a torque to the spreader mover to urge the spreader mover (and its foot pedal) to lie out of the way and alongside the rolling rear-leg unit. In such a ready-to-use refracted position, the foot pedal is nevertheless accessible and usable by a caregiver desiring to step on the foot pedal to unfold the mobile base to convert the stroller to the expanded use mode.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which:

FIG. 1 is a perspective view of a collapsible stroller in an illustrative collapsed storage mode and showing a mobile base in a folded position and a foot pedal included in a foot-actuated base opener that is coupled to the mobile base;

FIG. 2 is a side elevation view of the stroller of FIG. 1 showing an arrow representing a downward force applied by a caregiver to the foot pedal to cause the mobile base to unfold;

FIG. 3 is a perspective view similar to FIG. 1 after use by a caregiver of the foot-actuated based opener to unfold the mobile base and change the stroller to an expanded use mode;

DETAILED DESCRIPTION

Figure 8:
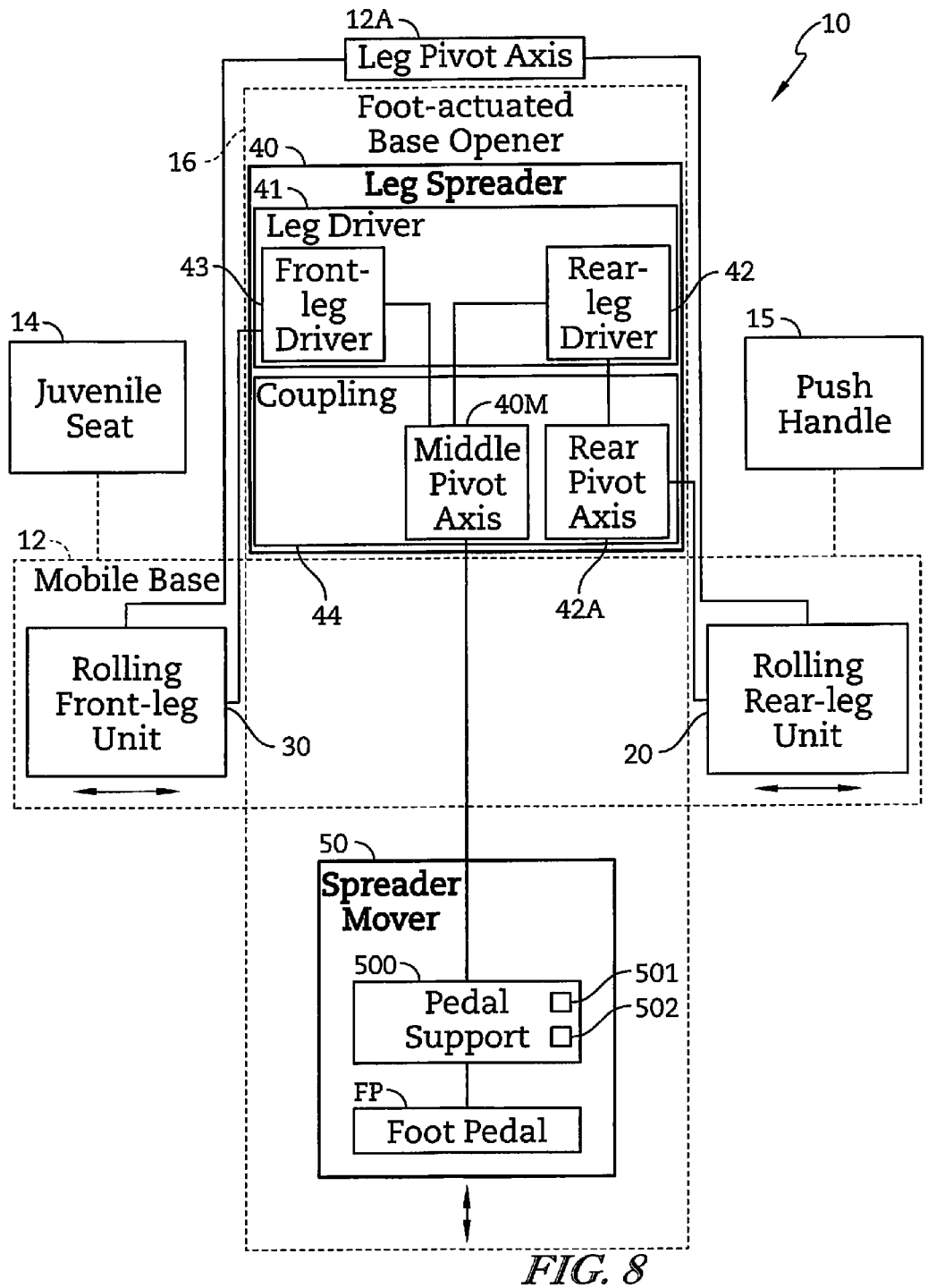
FIG. 8 is a diagrammatic view of a collapsible stroller in accordance with the present disclosure.

A collapsible stroller 10 in accordance with an embodiment of the present disclosure includes a mobile base 12, a juvenile seat 14 coupled to mobile base 12, and a push handle 15 coupled to mobile base 12 as suggested illustratively in FIGS. 1-3 and diagrammatically in FIG. 8. Stroller 10 includes a foot-actuated base opener 16 for use by a caregiver to unfold mobile base 12 suggested in FIGS. 1-3 to change stroller 10 from a collapsed storage mode shown in FIG. 1 to an expanded use mode shown in FIG. 3. A stroller 210 having a foot-actuated base opener 216 in accordance with another embodiment of the present disclosure is shown diagrammatically in FIG. 9.

Mobile base 12 of stroller 10 includes a rolling rear-leg unit 20 and a rolling front-leg unit 30 coupled to rolling rear-leg unit 20 for pivotable movement about a single (common) horizontal leg-pivot axis 12A between a folded position associated with a collapsed storage mode of stroller 10 and shown in FIG. 1 and an unfolded position associated with an expanded use mode of stroller 10 and shown in FIG. 3. A foot-actuated base opener 16 is included in stroller 10 as suggested in FIG. 2 and configured to include a foot pedal FP and to provide means for unfolding mobile base 12 to change mobile base 12 from the folded position shown in FIG. 1 to the unfolded position shown in FIG. 3 in response to application of a downward force F to foot pedal FP.

Mobile base 12 is configured to roll around and carry any suitable juvenile seat 14 as suggested in FIG. 3 and to fold when not in use to assume a folded position as suggested in FIG. 1. A caregiver can fold mobile base 12 by causing rolling front-leg unit 30 to pivot about leg-pivot axis 12A in a rearward (i.e. counterclockwise) direction toward rolling rear-leg unit 20. A caregiver can unfold mobile base 12 by causing rolling front-leg unit 30 to pivot about leg-pivot axis 12A in a forward (i.e. clockwise) direction way from rolling rear-leg unit 20 as suggested in FIGS. 1-3. Unfolding of mobile base 12 of stroller 10 is accomplished easily by applying a downward pedal-actuation force F to foot pedal FP of foot-actuated base opener 16 as suggested in FIG. 2 until rolling front-leg unit 30 is pivoted about leg-pivot axis 12A in a clockwise direction away from rolling rear-leg unit 20.

Rolling rear-leg unit 20 of mobile base 12 includes a rear frame 200 arranged to intersect leg-pivot axis 12A and rear wheels 201, 202 mounted on rear frame 200 for rotation about an axis of rotation 203 as suggested in FIG. 3. Rear frame 200 includes a horizontally extending rear strut 204 lying between rear wheels 201, 202 and extending along axis of rotation 203 as suggested in FIG. 3. Rear frame 200 also includes first and second rear legs 205, 206. First rear leg 205 is coupled to rear strut 204 to lie near first rear wheel 201 and second rear leg 206 is coupled to rear strut 204 to lie near second rear wheel 202.

Rolling front-leg unit 30 of mobile base 12 includes a front fame 300 arranged to intersect leg-pivot axis 12A and front wheels 301, 302 mounted on front frame 300 using a swivel mount in an illustrative embodiment shown in FIGS. 1-3 Front frame 300 includes first and second front legs 305, 306. A foot-rest panel 307 is coupled to front frame 300 in an illustrative embodiment as suggested in FIG. 3.

Figure 4:
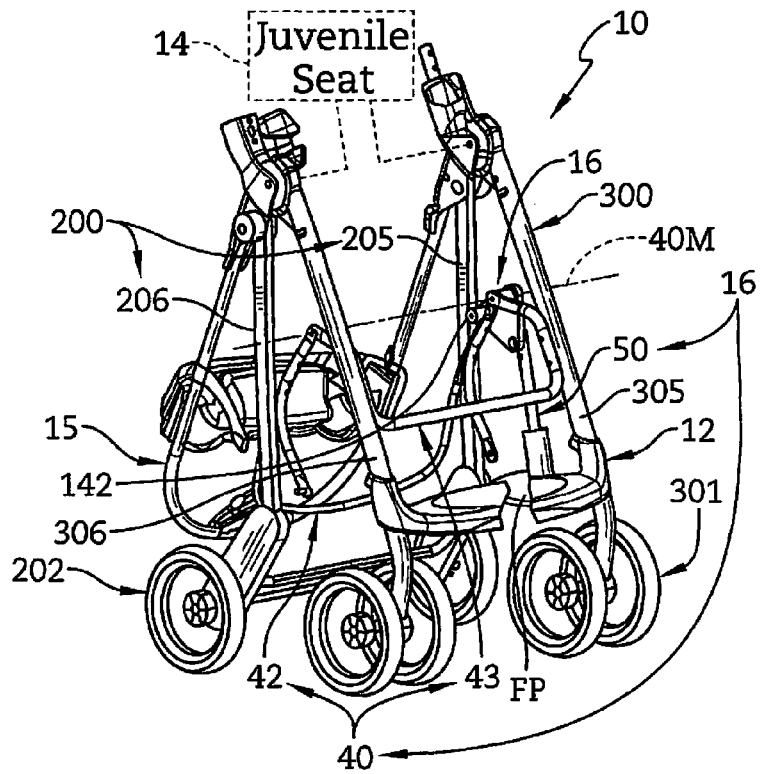
FIG. 4 is a perspective view of the stroller of FIGS. 1-3 taken from another point of view with a portion of a footrest broken away to show the foot pedal.

A collapsible stroller 10 in accordance with an embodiment of the present disclosure includes a mobile base 12, a juvenile seat 14 coupled to mobile base 12, a juvenile seat 14 coupled to mobile base 12, and a push handle 15 coupled to mobile base 12 as suggested in FIGS. 3 and 4. Stroller 10 includes a foot-actuated base opener 16 configured to unfold mobile base 12 as suggested in FIGS. 2, 4, 6, and 7 to change stroller 10 from a collapsed storage mode shown in FIGS. 1 and 4 to an expanded use mode shown in FIGS. 3 and 7.

Foot-actuated base opener 16 includes a foot pedal FP as shown in FIGS. 1-3. Unfolding of mobile base 12 of stroller 12 is accomplished easily by applying a downward pedal-actuation force F to foot pedal FP of foot-actuated base opener 16 as suggested in FIG. 2 until rolling front leg unit 30 of mobile base 12 is pivoted about leg-pivot axis 12A to move away from rolling rear-leg unit 20.

Figure 7:
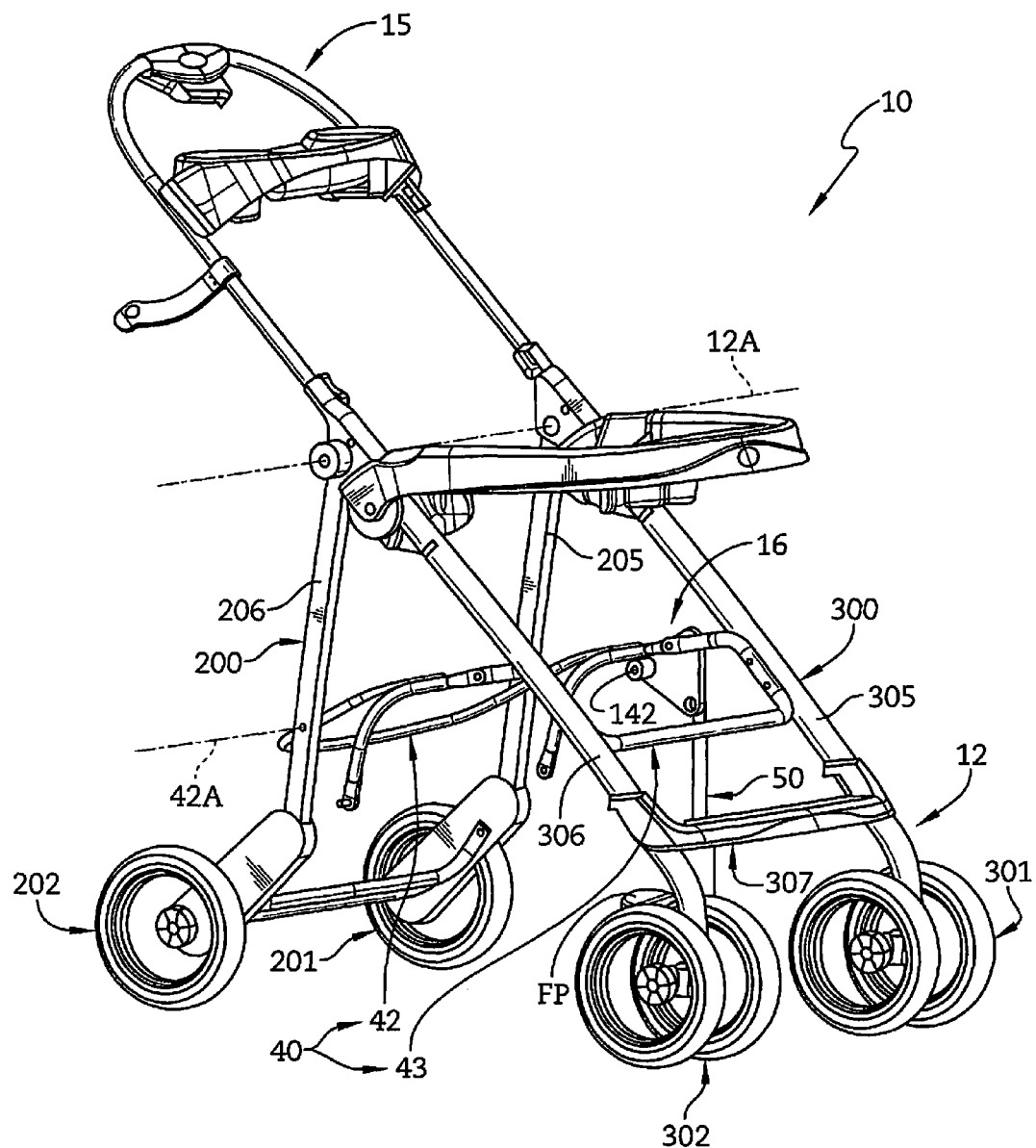
FIG. 7 is an enlarged perspective view similar to FIGS. 4 and 6 showing the stroller in the expanded use mode and the mobile base in a fully unfolded position.

Rolling rear-leg unit 20 of mobile base 12 includes a rear frame 200 comprising first and second rear legs 205, 206 as shown, for example, in FIG. 7. Rolling front-leg unit 30 of mobile base 12 includes front frame 300 comprising first and second front legs 305, 306. A footrest 307 is coupled to front legs 305, 306.

Foot-actuated base opener 16 includes a leg spreader 40 pivotably coupled to each of rear legs 205, 206 and rigidly coupled to each of front legs 305, 306 and a spreader mover 50 pivotably coupled to leg spreader 40 and formed to include foot pedal FP as suggested in FIGS. 3 and 7. Leg-spreader 40 includes a rear-leg driver 42 pivotably coupled to rear legs 205, 206 for pivotable movement about rear pivot axis 42A and a front-leg driver 43 rigidly coupled to front legs 305, 306 and pivotably coupled to rear-leg driver 42 for pivotable movement about a middle pivot axis 40. Spreader mover 50 includes a pedal support 500 comprising a plate 501 coupled to rear-leg driver 42 and front-leg driver 34 at middle pivot axis 40M and a post 502 having an upper end pivotably coupled to plate 501 and a lower end rigidly coupled to foot pedal FP. Plate 501 is triangle-shaped in an illustrative embodiment as shown in FIGS. 4 and 5.

Figure 5:
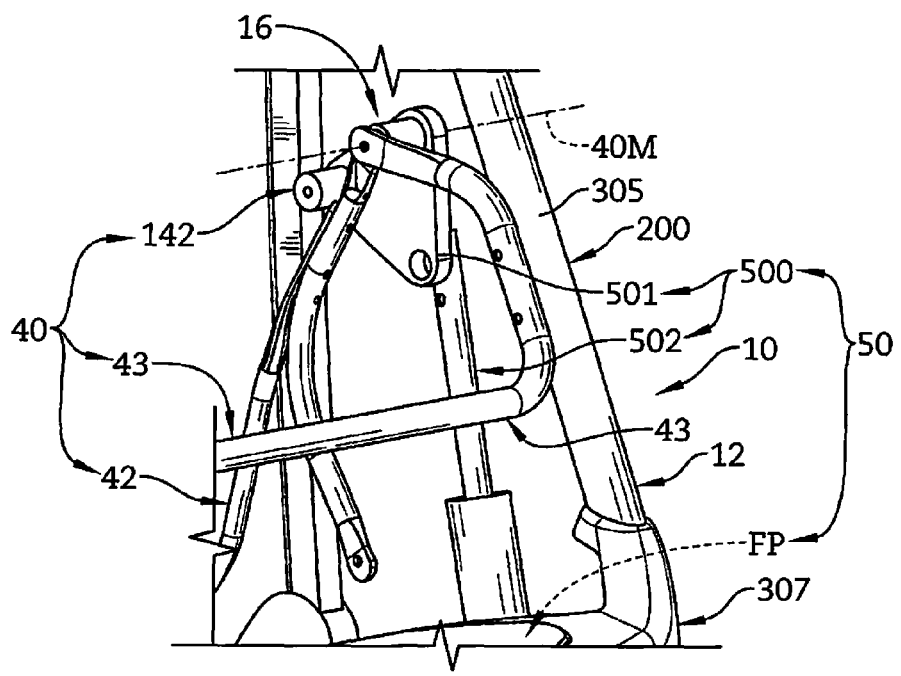
FIG. 5 is an enlarged view of a portion of the stroller shown in FIG. 4.
Figure 6:
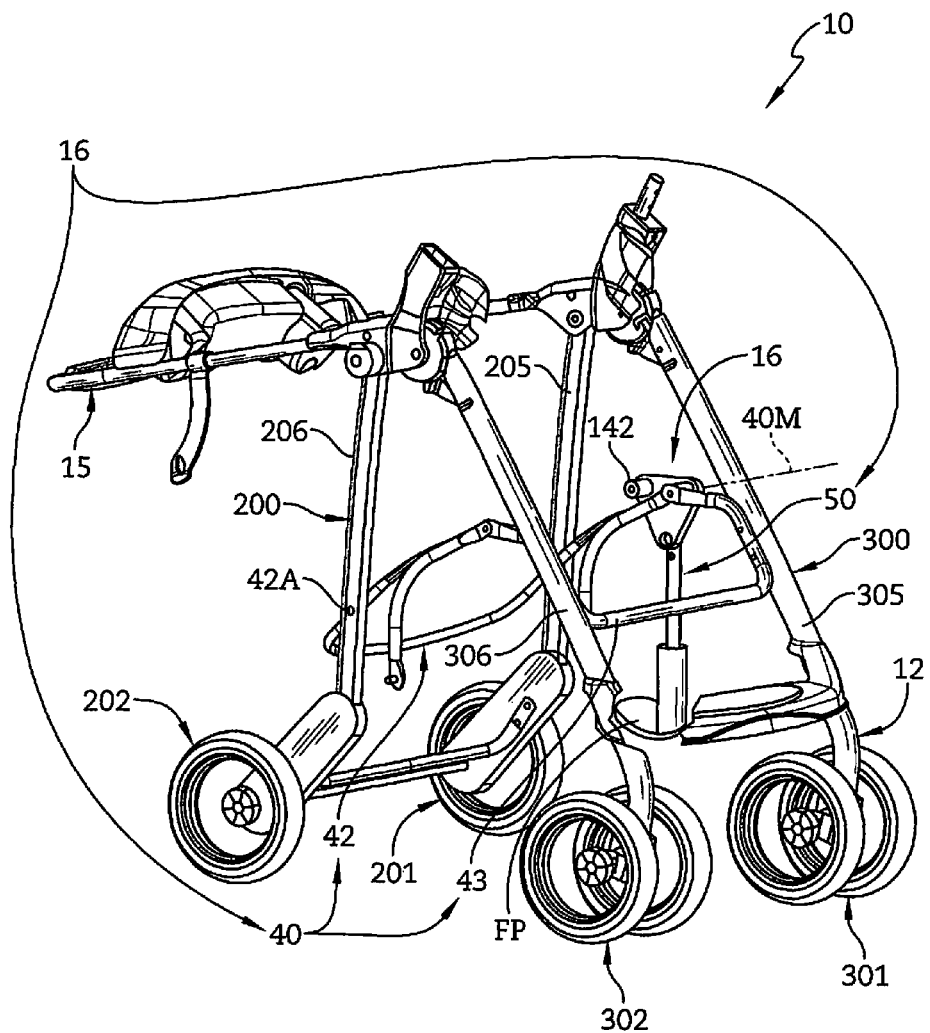
FIG. 6 is a perspective view similar to FIG. 4 showing the stroller in a partly opened position and the mobile base in a partly unfolded position.

Leg spreader 40 also includes an auxiliary rear-leg driver or post 142 coupled to triangle-shaped plate 501 and arranged to engage rear leg 205 during an early stage of unfolding of mobile base 12 as suggested in FIGS. 4 and 5. Auxiliary rear-leg driver 142 is configured to provide means for engaging rear leg 205 of mobile base 12 during unfolding of mobile base 12 to apply a movement-inducing force to rear leg 205 so that unfolding of mobile base 12 is expedited.

In use, while mobile base 12 is folded and stroller 10 is in collapsed storage mode as shown in FIG. 1, a caregiver desiring to change stroller 10 to the expanded use mode steps on foot pedal FP included in spreader mover 50 to apply a downward force F as suggested in FIG. 2. Such downward motion of spreader mover 50 pulls inner portions of rigid front-leg driver 43 and pivotable rear-leg driver 42 simultaneously in a downward direction toward the ground underlying stroller 10 to cause outer portions of rigid front-leg driver 43 and pivotable rear-leg driver to move away from one another. This foot pressure is applied by the caregiver until the rolling front-leg and rear-leg units 30, 20 are spread apart to unfold mobile base 12 fully and therefore cause stroller 12 to be converted to expanded use mode as shown in FIGS. 3 and 7.

A collapsible stroller 10 comprises a mobile base 12, a juvenile seat 14, and a foot-actuated base opener 16 as suggested illustratively in FIGS. 1-3 and diagrammatically in FIG. 8. Foot-actuated base opener 16 is configured to be operated by a caregiver to open a collapsed stroller as suggested in FIGS. 2 and 3 by applying a downward force F to the foot-actuated base opener 16.

Mobile base 12 includes a rolling rear-leg unit 20 having rear wheels 201, 202 and a rolling front-leg unit 30 having front wheels 301, 302. Rolling front-leg unit 30 is mounted for folding movement relative to the rolling rear-leg unit 20 between a folded position alongside the rolling rear-leg unit 20 and associated with a collapsed storage mode of the stroller 10 wherein the front and rear wheels 301, 201 are arranged to lie in close proximity to one another to define a first distance D1 therebetween as shown in FIG. 1 and an unfolded position separated from rolling rear-leg unit 20 associated with an expanded use mode of stroller 10 wherein front and rear wheels 301, 201 are arranged to lie in spread-apart relation to one another to define a greater second distance D2 therebetween as shown in FIG. 3.

Juvenile seat 14 is mounted for movement with mobile base 12. Any suitable juvenile seat may be used.

Foot-actuated base opener 16 includes a spreader mover including a first foot pedal FP and a leg spreader 40. Leg spreader 40 is coupled to the rolling rear-leg unit 20, the rolling front-leg unit 30, and the spreader mover 50 for movement relative to each of the rolling rear-leg and front-leg units 20, 30 between a drawn-together leg position shown in FIG. 1 and associated with the collapsed storage mode of the stroller 10 and a spread-apart leg position shown in FIG. 3 and associated with the expanded use mode of the stroller 10.

Spreader mover 50 further includes pedal-support means 500 for moving the leg spreader 40 relative to the rear and front wheels 201, 301 from the drawn-together leg position to the spread-apart leg position to unfold rolling front-leg unit 30 of mobile base 12 and move front wheel 301 of rolling front-leg unit 30 away from rear wheel 201 of rolling rear-leg unit 20 in response to application of a downward force F to the foot pedal FP. This causes the rolling front-leg unit 30 to be moved from the folded position alongside rolling rear-leg unit 30 to the unfolded position separated from rolling rear-leg unit 20.

Leg spreader 40 includes a leg driver 41 arranged to move relative to each of rolling front-leg and rear-leg units 30, 20 during change of stroller 10 from the collapsed storage mode to the expanded use mode and a coupling 44 configured to provide pivot means for pivotably coupling leg driver 40 relative to each of the rolling front-leg unit 30, rolling rear-leg unit 20, and pedal-support means 500 to cause rolling front-leg unit 30 to pivot about an axis relative to leg driver 40 to move from the folded position alongside rolling rear-leg unit 20 to the unfolded position separated from rolling rear-leg unit 20 in response to application of the downward force F to the foot pedal FP included in the spreader mover 50. Leg-driver 41 comprises front-leg driver 43 and rear-leg driver 42 as suggested in FIG. 8. The pedal-support means 500 is arranged to locate the foot pedal FP below juvenile seat 14 and the pivot means 44 and above the ground underlying the front and rear wheels 301, 201 upon movement of rolling front-leg unit 30 to the unfolded position.

Spreader mover 50 further includes spring means 60 for yieldably urging the pedal-support means 500 to move relative to rear leg driver 42 of leg driver 41 from an extended position separated from rolling rear-leg unit 20 and arranged to define an included angle therebetween of greater than 20° to a retracted position arranged to lie alongside rolling rear-leg unit 20. Spring means 60 is configured to cause a rear-leg driver 42 of leg driver 41 to remain in the retracted position until a downward force F in excess of a predetermined amount is applied to the foot pedal FP to cause the pedal-support means 500 to pivot about an axis and move away from rolling rear-leg unit 20.

Figure 9:
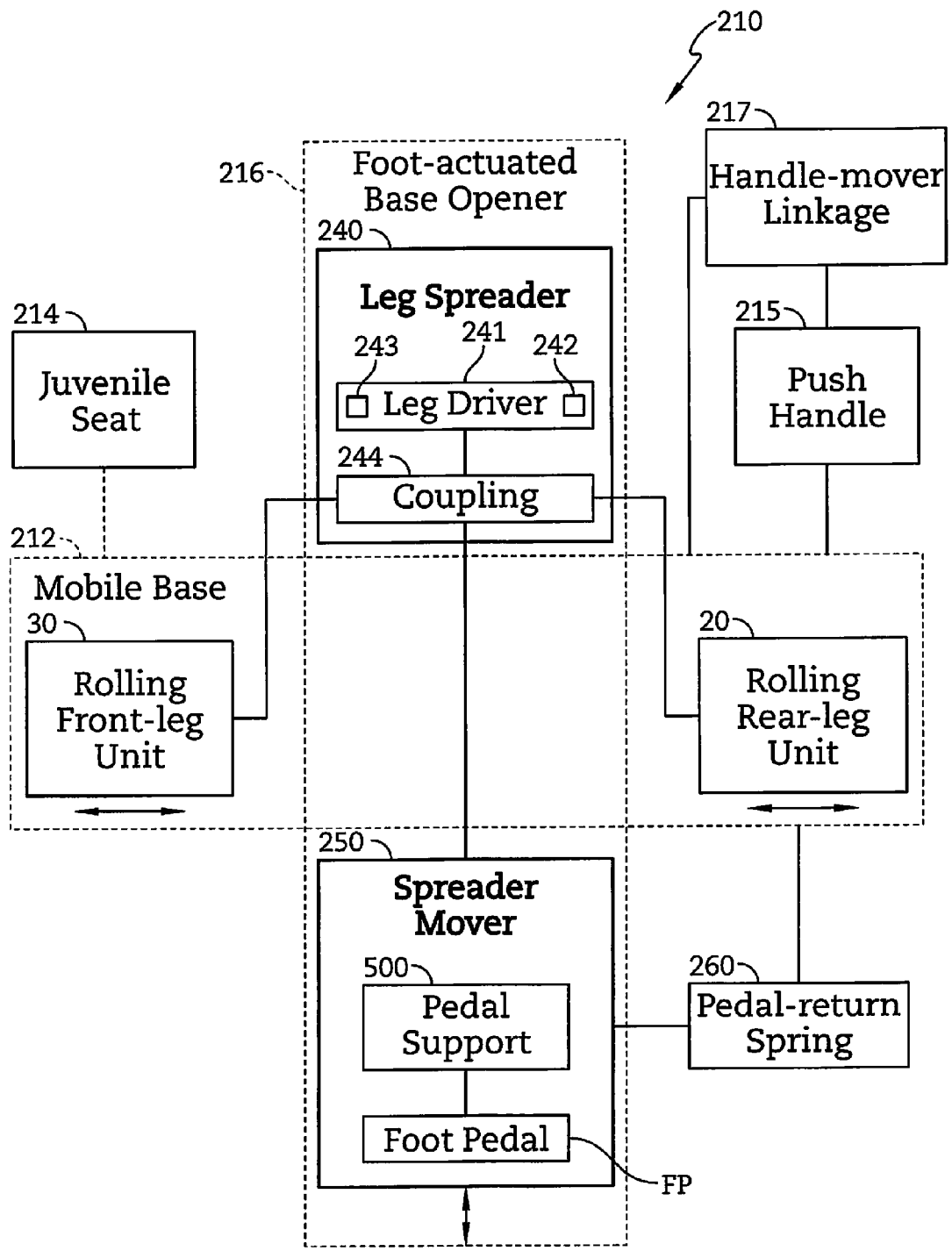
FIG. 9 is a diagrammatic view of a collapsible stroller in accordance with another embodiment of the present disclosure.

A collapsible stroller 210 in accordance with another embodiment of the present disclosure includes a mobile base 212, a foot-actuated base opener 216, and a handle-mover linkage 217 as suggested diagrammatically in FIG. 9. Mobile base 212 includes a rolling rear-leg unit 20 and a rolling front-leg unit 30 arranged to move relative to the rolling rear-leg unit 20 from a folded position located alongside the rolling rear-leg unit 20 and associated with a collapsed storage mode of the collapsible stroller 210 to an unfolded position located apart from the rolling rear-leg unit 20 and associated with an expanded use mode of the collapsible stroller 210. Foot-actuated base opener 216 is formed to provide means for moving the rolling front-leg unit 30 away from the rolling rear-leg unit 20 from the folded position to the unfolded position to unfold mobile base 212 in response to application of a downward force to a foot pedal FP included in foot-actuator base opener 216 to move foot pedal FP closer to the ground underlying mobile base 212 so that collapsible stroller 210 changes from the collapsed storage mode to the expanded use mode.

Rolling front-leg unit 30 is arranged to pivot about a leg-pivot axis during movement of rolling front-leg unit 30 from the folded position to the unfolded position. Foot-actuated base opener 216 includes a spreader mover 250 located below the leg-pivot axis and a leg spreader 240 configured to provide leg-spreader means for pivoting rolling front-leg unit 30 about the leg-pivot axis from the folded position alongside the rolling rear-leg unit to the unfolded position apart from the rolling rear-leg unit in response to downward movement of the foot pedal away from the leg-pivot axis.

Leg spreader 240 includes a front-leg driver 243 coupled to rolling front-leg unit 30 and a rear-leg driver 242 coupled to rolling rear-leg unit 20. Front-leg driver 243 is pivotably coupled to rear-leg driver 242 for relative pivotable movement about a shared pivot axis during movement of rolling front-leg unit 30 between the folded and unfolded positions. Rolling front-leg unit 30 is pivotably coupled to rolling rear-leg unit 20 at the leg-pivot axis. Spreader mover 250 is coupled to one of the front-leg and rear-leg drivers to position foot pedal FP to lie in spaced-apart relation to the leg-pivot axis.

Spreader mover 250 is coupled to leg spreader 240 for pivotable movement about a pivot axis between a ready-to-use retracted position alongside rolling rear-leg unit 20 and a downwardly extending actuated position placing foot pedal FP in closer proximity to the ground underlying mobile base 212. Foot-actuated base opener 216 further includes a pedal-return spring 260 coupled to spreader mover 250 and configured to provide torsion means for yieldably applying a torque to spreader mover 250 to pivot the spreader mover 250 about the pivot axis from the downwardly extending actuated position to a ready-to-use retracted position so that foot pedal FP is arranged to receive the downward force to move foot pedal FP closer to the ground and cause mobile base 212 to unfold.

The invention claimed is:

1. A collapsible stroller comprising
a mobile base including a rolling rear-leg unit having a rear wheel and a rolling front-leg unit having a front wheel and being mounted for folding movement relative to the rolling rear-leg unit between a folded position alongside the rolling rear-leg unit and associated with a collapsed storage mode of the stroller wherein the front and rear wheels are arranged to lie in close proximity to one another to define a first distance therebetween and an unfolded position separated from the rolling rear-leg unit associated with an expanded use mode of the stroller wherein the front and rear wheels are arranged to lie in spread-apart relation to one another to define a greater second distance therebetween,
a juvenile seat mounted for movement with the mobile base, and
a foot-actuated base opener including
a spreader mover including a first foot pedal and
a leg spreader coupled to the rolling rear-leg unit, the rolling front-leg unit, and the spreader mover for movement relative to each of the rolling rear-leg and front-leg units between a drawn-together leg position associated with the collapsed storage mode of the stroller and a spread-apart leg position associated with the expanded use mode of the stroller,
wherein the spreader mover further includes pedal-support means for moving the leg spreader relative to the rear and front wheels from the drawn-together leg position to the spread-apart leg position to unfold the rolling front-leg unit of the mobile base and move the front wheel of the rolling front-leg unit away from the rear wheel of the rolling rear-leg unit in response to application of a downward force to the first foot pedal so that the rolling front-leg unit is moved from the folded position alongside the rolling rear-leg unit to the unfolded position separated from the rolling rear-leg unit.

2. The collapsible stroller of claim 1, wherein the leg spreader includes a leg driver arranged to move relative to each of the rolling front-leg and rear-leg units during change of the stroller from the collapsed storage mode to the expanded use mode and pivot means for pivotably coupling the leg driver to each of the rolling front-leg unit, rolling rear-leg unit, and the pedal-support means to cause the rolling front-leg unit to pivot about an axis relative to the leg driver to move from the folded position alongside the rolling rear-leg unit to the unfolded position separated from the rolling rear-leg unit in response to application of the downward force to the first foot pedal included in the spreader mover.

3. The collapsible stroller of claim 2, wherein the pedal-support means is arranged to locate the first foot pedal below the juvenile seat and the pivot means and above ground underlying the front and rear wheels upon movement of the rolling front-leg unit to the unfolded position.

4. The collapsible stroller of claim 2, wherein the spreader mover further includes spring means for yieldably urging the pedal-support means to move relative to the leg driver from an extended position separated from the rolling rear-leg unit and arranged to define an included angle therebetween of greater than 20° to a retracted position arranged to lie alongside the rolling rear-leg unit until a downward force in excess of a predetermined amount is applied to the first foot pedal to cause the pedal-support means to pivot about an axis and move away from the rolling rear-leg unit.

5. The collapsible stroller of claim 1, wherein the leg spreader includes a leg driver arranged to move relative to each of the rolling front-leg and rear-leg units during change of the stroller from the collapsed storage mode to the expanded use mode and pivotably coupled to each of the rolling front-leg unit, rolling rear-leg unit, and pedal-support means to cause the rolling front-leg unit to pivot about an axis relative to the leg driver from the folded position alongside the rolling rear-leg unit to the unfolded position separated from the rolling rear-leg unit in response to application of the downward force to the first foot pedal.

6. The collapsible stroller of claim 1, wherein the leg spreader includes a front-leg driver coupled to the rolling front-leg unit to remain in a stationary position relative to the rolling front-leg unit during folding movement of the rolling front-leg unit relative to the rolling rear-leg unit and a rear-leg driver pivotably coupled to the rolling rear-leg unit for pivotable movement about a rear pivot axis and to the front-leg driver for pivotable movement about a middle pivot axis.

7. The collapsible stroller of claim 6, wherein the pedal-support means is coupled to the front-leg driver and to the rear-leg driver at the middle pivot axis.

8. The collapsible stroller of claim 7, wherein the spreader mover includes a pedal support including a triangle-shaped plate and a middle leg arranged to interconnect the triangle-shaped plate and the first foot pedal, the triangle-shaped plate has three corners comprising a front corner, a ground corner, and a rear corner, the middle pivot axis is arranged to intersect a front corner associated with the rolling front-wheel unit and the middle leg is arranged to intersect a ground corner associated with ground underlying the front and rear wheels and arranged to lie between the front corner and the front and rear wheels, and further comprising an auxiliary rear-leg driver coupled to the rear corner and arranged to engage the rolling rear-leg unit during unfolding of the mobile base.

9. The collapsible stroller of claim 8, wherein the rolling rear-leg unit includes first and second rear legs, the rolling front-leg unit includes a first front leg mounted for pivotable movement relative to the first rear leg about a leg pivot axis and a second front leg mounted for pivotable movement relative to the second rear leg about the leg pivot axis, the rear wheel is rotatably mounted to the first rear leg, the front wheel is rotatably mounted to the first front leg, and the triangle-shaped plate is arranged to lie between the first rear leg and the first front leg.

10. The collapsible stroller of claim 9, wherein the first foot pedal is arranged to lie under the triangle-shaped plate and the leg of the pedal-support means has an upper end coupled to the ground corner of the triangle-shaped plate and a lower end rigidly coupled to the first foot pedal.

11. The collapsible stroller of claim 6, wherein the front-leg driver and rear-leg driver are arranged to move relative to one another and pivot about the middle pivot axis simultaneously to cause the rear-leg driver to pivot about the rear pivot axis to change from a nearly vertical orientation to a nearly horizontal orientation to cause the front-leg unit to move from the folded position to the unfolded position in response to downward movement of the first foot pedal toward ground underlying the front and rear wheels.

12. The collapsible stroller of claim 1, wherein the pedal-support means includes a pedal support coupled to the first foot pedal, the rolling front-leg unit is coupled to the rolling rear-leg unit for pivotable movement about a leg pivot axis between the folded and unfolded positions, the leg spreader includes a front-leg driver coupled to the rolling front-leg unit to pivot therewith and a rear-leg unit to pivot therewith and a rear-leg driver pivotably coupled to the rolling rear-leg unit for pivotable movement about a rear pivot axis, and the front-leg driver, the rear-leg driver, and the pedal support are arranged to pivot relative to one another about a middle pivot axis that is arranged to lie between the leg-pivot axis and ground underlying the front and rear wheels.

13. The collapsible stroller of claim 12, wherein the pedal support includes a plate mounted for pivotable movement to free ends of the rolling front-leg and rear-leg units at the middle pivot axis to allow pivotable movement of the rolling front-leg and rear-leg units relative to the hip plate about the middle pivot axis during folding and unfolding movement of the rolling front-leg unit relative to the rolling rear-leg unit and the pedal support further includes a middle leg arranged to interconnect the hip plate and the first foot pedal.

14. The collapsible stroller of claim 13, wherein the plate is triangle-shaped and has three corners comprising a front corner, a ground corner, and a rear corner, the middle leg is coupled to the plate at the ground corner, and the pedal support further includes an auxiliary rear-leg driver coupled to the rear corner and arranged to engage the rolling rear-leg unit during folding of the mobile base.

15. A collapsible stroller comprising
a mobile base including a rolling rear-leg unit and a rolling front-leg unit arranged to move relative to the rolling rear-leg unit from a folded position located alongside the rolling rear-leg unit and associated with a collapsed storage mode of the collapsible stroller to an unfolded position located apart from the rolling rear-leg unit and associated with an expanded use mode of the collapsible stroller, and
a foot-actuated base opener formed to provide means for moving the rolling front-leg unit away from the rolling rear-leg unit from the folded position to the unfolded position to unfold the mobile base in response to application of a downward force to a foot pedal included in the foot-actuator base opener to move the foot pedal closer to ground underlying the mobile base so that the collapsible stroller changes from the collapsed storage mode to the expanded use mode.

16. The collapsible stroller of claim 15, wherein the rolling front-leg unit is arranged to pivot about a leg-pivot axis during movement of the rolling front-leg unit from the folded position to the unfolded position and the foot-actuated base opener includes a spreader mover located below the leg-pivot axis and leg-spreader means for pivoting the rolling front-leg unit about the leg-pivot axis from the folded position alongside the rolling rear-leg unit to the unfolded position apart from the rolling rear-leg unit in response to downward movement of the foot pedal away from the leg-pivot axis.

17. The collapsible stroller of claim 16, wherein the leg-spreader means includes a front-leg driver coupled to the rolling front-leg unit and a rear-leg driver coupled to the rolling rear-leg unit, the front-leg driver is pivotably coupled to the rear-leg driver for relative pivotable movement about a shared pivot axis during movement of the rolling front-leg unit between the folded and unfolded positions.

18. The collapsible stroller of claim 17, wherein the rolling front-leg unit is pivotably coupled to the rolling rear-leg unit at the leg-pivot axis and the spreader mover is coupled to one of the front-leg and rear-leg drivers to position the foot pedal to lie in spaced-apart relation to the leg-pivot axis.

19. The collapsible stroller of claim 16, wherein the spreader mover is coupled to the leg-spreader means for pivotable movement about a pivot axis between a ready-to-use retracted position alongside the rolling rear-leg unit and a downwardly extending actuated position placing the foot pedal in closer proximity to ground underlying the mobile base and the foot-actuated base opener further includes a pedal-return spring coupled to the spreader mover and configured to provide torsion means for yieldably applying a torque to the spreader mover to pivot the spreader mover about the pivot axis from the downwardly extending actuated position to a ready-to-use retracted position so that the foot pedal is arranged to receive the downward force to move the foot pedal closer to the ground and cause the mobile base to unfold.

* * * * *